United States Patent [19]
Chandra

[11] Patent Number: 6,078,569
[45] Date of Patent: Jun. 20, 2000

[54] CONTROL OF A COMPUTER NETWORK CONFIGURATION IN RESPONSE TO TRAFFIC ON THE NETWORK

[75] Inventor: Arun Chandra, Austin, Tex.

[73] Assignee: International Business Machines Corporation, Armonk, N.Y.

[21] Appl. No.: 08/967,536

[22] Filed: Nov. 12, 1997

[51] Int. Cl.[7] ............................ H04L 12/56; H04Q 11/04; G06F 13/38
[52] U.S. Cl. ........................... 370/330; 370/436; 370/395; 709/232; 714/4
[58] Field of Search ................................... 709/242, 201, 709/232, 102, 103, 300; 370/330, 280, 342, 436, 441, 256, 58, 60, 86, 89, 395, 94; 714/48, 45, 10, 15, 4, 1; 712/29, 200, 18

[56] References Cited

U.S. PATENT DOCUMENTS 5,404,562  4/1995  Heller et al. ................................ 712/18
5,944,779  8/1999  Blum ........................................ 709/201

OTHER PUBLICATIONS

"Survey of Interconnection Networks", authors Tse–yen Feng, Computer, Dec., 1981, p. 5–20.

*Primary Examiner*—Daniel H. Pan
*Attorney, Agent, or Firm*—Anthony V. S. England

[57] ABSTRACT

Links in a network are switched between nodes in response to traffic and failure status of network links as follows. A total message time is calculated for a given network configuration. Nodes are identified having the most and the least messages. A new network configuration is considered, wherein a link from the minimum traffic nodes is reconfigured to the maximum traffic nodes. A maximum link and/or maximum connectivity rule are evaluated for the possible new configuration. If such a rule is not violated and the total message time is improved by the new configuration, the analysis is repeated for possible third, fourth, etc. configurations.

39 Claims, 5 Drawing Sheets

| From-To Nodes | Traffic (msgs) | delay (units) | msg x unit delay |
|---|---|---|---|
| 1-2 | 100 | 1 | 100 |
| 1-3 | 100 | 1 | 100 |
| 1-4 | 150 | 1 | 150 |
| 2-3 | 400 | 1 | 400 |
| 2-4 | 200 | 1 | 200 |
| 3-4 | 50 | 1 | 50 |
| | 1000 | | 1000 |

FIG. 3A

| From-To Nodes | Traffic (msgs) | delay (units) | msg x unit delay |
|---|---|---|---|
| 1-2 | 100 | 1 | 100 |
| 1-3 | 100 | 1 | 100 |
| 1-4 | 150 | 1 | 150 |
| 2-3 | 400 | 0.5 | 200 |
| 2-4 | 200 | 1 | 200 |
| 3-4 | 50 | 2 | 100 |
| | 1000 | | 850 |

FIG. 3B

| From-To Nodes | Traffic (msgs) | delay (units) | msg x unit delay |
|---|---|---|---|
| 1-2 | 100 | 2 | 200 |
| 1-3 | 100 | 1 | 100 |
| 1-4 | 150 | 1 | 150 |
| 2-3 | 400 | 0.5 | 200 |
| 2-4 | 200 | 0.5 | 100 |
| 3-4 | 50 | 2 | 100 |
| | 1000 | | 850 |

FIG. 6

CONTROL OF A COMPUTER NETWORK CONFIGURATION IN RESPONSE TO TRAFFIC ON THE NETWORK

FIELD OF THE INVENTION

This invention relates generally to computer networks and more specifically may apply to controlling a computer network configuration in response to traffic on the network.

CROSS REFERENCE TO RELATED PATENT APPLICATIONS

None.

BACKGROUND OF THE INVENTION

In a network computing environment, a good network architecture is key, in addition to having thin clients connected to the network. Goodness in a network can be measured by high performance and reliability. Both these parameters can be improved by adding more hardware. However, in big networks like ones connecting corporate intranets, cost of adding hardware becomes a substantial factor.

There are a variety of network topologies. See for example "A Survey of Interconnection Networks", author, Tse-yun Feng, COMPUTER, December, 1981, pages 5–20. There is no single network topology, however, which provides the best performance for all possible message distributions. Therefore, it is desirable to have a network which adapts itself automatically to changes in the distribution of messages being transmitted throughout the network. This is especially desirable for global networks where message distribution is affected by the time differences across the world.

SUMMARY OF THE INVENTION

It is therefore an object of the invention to provide a network, and a method for controlling the network, which is responsive to traffic distribution. It is another object of the invention to provide such a network and control method having both static and dynamic characteristics.

According to the present invention, the foregoing and other objects are obtained by switching links between nodes in the network in response to the distribution of messages on the network. The messages have source and destination nodes, so that a message's source and destination nodes define a node pair within the network with which the message is associated. Thus, each node pair in the network has a determinable number of associated messages. In another aspect, the network begins with an initial configuration, such as a chordal configuration. A complete chordal configuration is one in which each node is directly connected, that is, connected by a single link, to each of the other nodes in the network. Thus, it is possible in such a chordal network for a message to be transmitted from one node to another through a single link.

The network is switched from the initial configuration to a second configuration as follows. A total message time for the first configuration is calculated. Then the distribution of messages throughout the network is measured and one or more pairs of the nodes is identified as having the most messages being transmitted therebetween. Also, one or more of the node pairs is identified as having the least number of messages being transmitted therebetween. One of the pairs of nodes having the maximum number and one of the pairs of nodes having the minimum of messages is selected and a link from the pair having the minimum number of messages is considered for moving to the pair of nodes having the maximum number of messages. Based on this move, a total message time is calculated for the second configuration of the links. That is, the second configuration considers that the move which was contemplated has been made. Then, if the second configuration has a smaller total message time than the first configuration's total message time, the link is switched as contemplated.

In another aspect of the invention, this process of analysis is repeated before the actual switching of the links. That is, after it is determined that the second configuration would provide a better total message time than the first configuration, a third configuration is considered. The third configuration starts from the second configuration, examines the node pairs, excluding the node pairs which were selected in the first iteration, and identifies at least one node pair having a maximum number of messages and at least one node pair having a minimum number of messages. Then a third network configuration is identified, where the link connecting the node pair having the newly identified minimum number of messages is moved to the node pair having the newly identified maximum number of messages. A total message time is calculated for the third configuration and compared with the total message time for the second configuration. If the third configuration's total message time is an improvement over that of the second configuration, then the process of analysis is repeated again. However, if the third configuration's total message time is not an improvement over the second configuration, then the network is physically switched to that of the second configuration.

After the physical switching, the network remains static for a fixed amount of time, as determined by a network administrator. Then, after the preselected time interval, the traffic is again analyzed starting with the existing network configuration. That is, the calculations of total message time, selections of node pairs having maximum and minimum traffic, etc, is repeated again.

Alternatively, the network could remain static until some event triggers another iteration of analysis in switching. Such triggers could include manual triggering in response to user or administrator observations, and automatic triggering in response to predetermined timeout or threshold measures.

In another aspect of the invention, the links interconnecting the nodes have first and second ends so that a link's ends define a node pair with which the link is associated. Thus, for a given network configuration, each node pair in the network has a determinable number of associated links. The calculating of total message time for any particular configuration includes computing products of certain factors for each one of the respective pairs of nodes in the network. The factors which are included in the multiplication, include a physical delay time per link, the number of links for the respective node pair and the number of messages for the respective node pair. The physical delay time per link is a function of the network's physical characteristics and may be entered as a fixed parameter by the network administrator. The total message time for any particular configuration is then determined by summing the products for each of the nodes of the network for that particular configuration.

In another aspect of the invention, the selecting of pairs of nodes for moving a link from and to, is limited to selecting pairs which maintain a network path having a maximum of two series connected links between each node pair in the network. That is, if moving a link from one node pair to another would result in the network having a configuration wherein more than two series connected links must be traversed in order to get from any one node to any other node in the network, then this particular move is removed from consideration. That is, the pair of nodes from which the link would have been moved, and the pair of nodes to which the link would have been moved, are removed from further consideration. In another aspect, the selecting of a node pair from which to move a link and a node pair to which the link is to be moved, is limited to selecting from among nodes, such that after the proposed moving of a link the resulting network configuration has a maximum of two links associated with each of the node pairs in the network.

It is an advantage of the present invention that it provides a network responsive to traffic, and to failure status of links in the network, in a switchable network, beginning from a highly reliable network configuration, such as a complete chordal architecture.

Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims. The invention is intended to be limited only as defined in the claims.

DETAILED DESCRIPTION OF THE PREFERRED EMBODIMENT

To clearly point out novel features of the present invention, the following discussion omits or only briefly describes conventional features of information processing systems which are apparent to those skilled in the art. It is assumed that those skilled in the art are familiar with network topologies, clustered systems, and a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Figure 1:
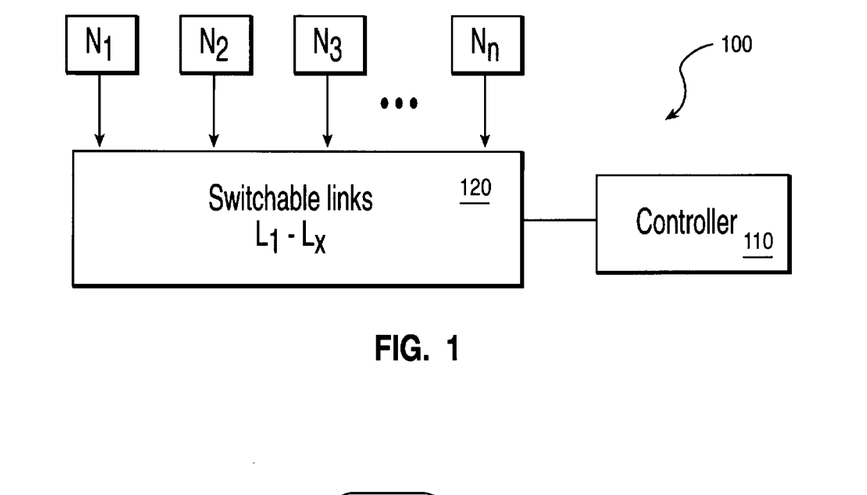
FIG. 1 is a block diagram illustrating an embodiment of the present invention.

Referring now to FIG. 1, a network for a preferred embodiment is illustrated. The network has a number of nodes, $N_1$, $N_2$, $N_3$, and so on, through $N_n$. The nodes are interconnected by switchable links which are illustrated collectively as functional block 120 in FIG. 1. The illustration indicates that there are a number of switchable links $L_1$ through $L_x$. In a preferred embodiment, the number of links X are sufficient to interconnect the nodes in a complete chordal architecture. Thus, in such a case there would be at least $(n!/[2!(n-2)!]$ links for the case where there are n nodes. (This is derived from a well-known formula for the number of combinations of n things taken 2 at a time, also referred to by the symbol "$_nC_r$". In the present instance the formula is applicable because a single link connects 2 nodes, so that a complete chordal network has a number of links corresponding to the number of combinations of n nodes taken 2 at a time "$_nC_2$".) The links are switchable such that they can be moved from interconnecting one pair of nodes to interconnecting a different pair. The switching of the links is controlled by controller 110.

Figure 2:
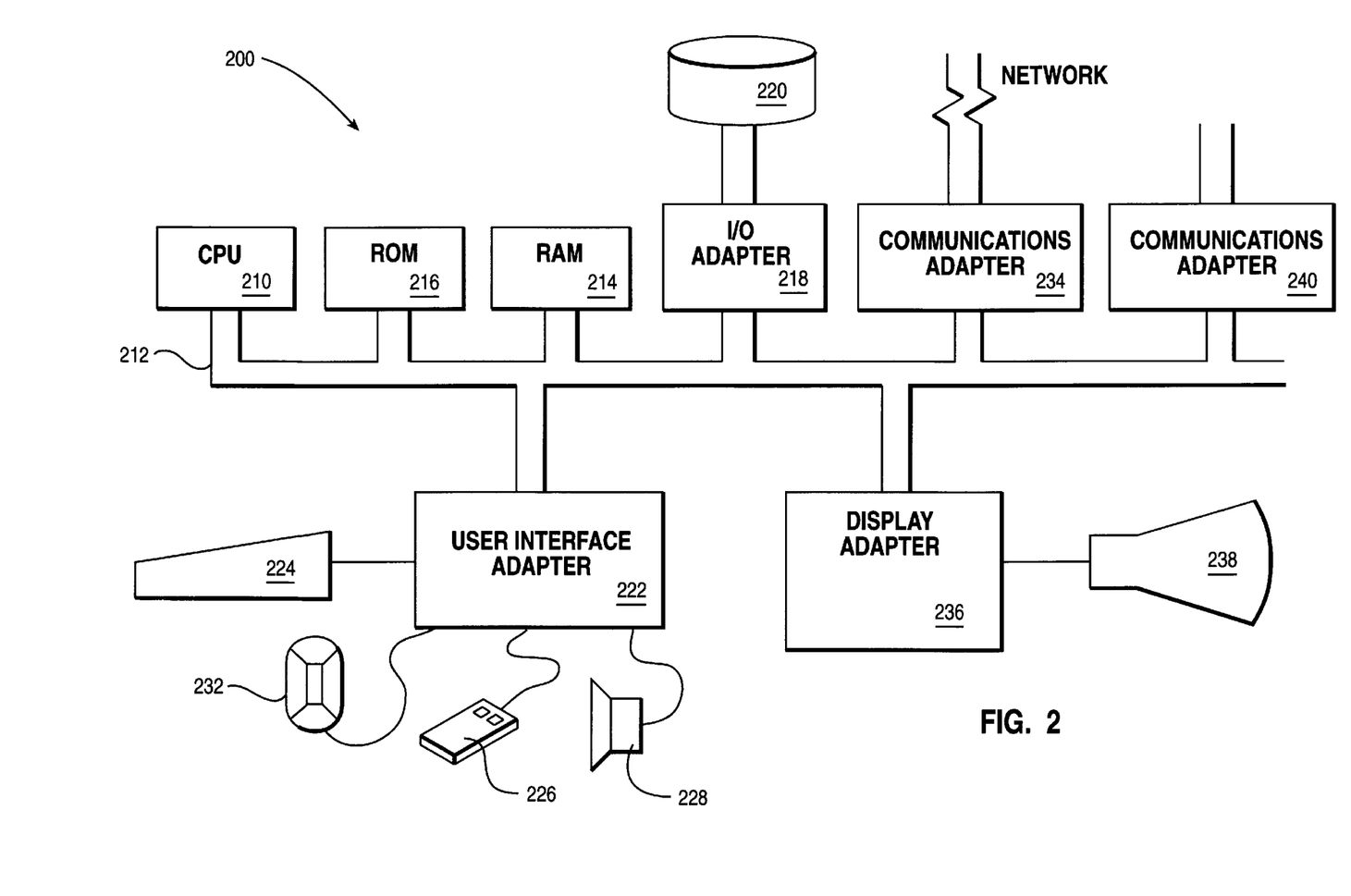
FIG. 2 illustrates a computer system which may be used as the controller of the embodiment in FIG. 1.

Referring first to FIG. 2, an example is shown of a data processing system 200 which may be used for the controller 110 of FIG. 1. Alternatively, and perhaps more efficiently, the network controller can be an application specific device, programmed or configured to perform the functions set forth herein in the FIG's and pseudo-code. The more general purpose system of FIG. 2, which may be used as a controller 110, has a central processing unit (CPU) 210, such as a PowerPC microprocessor ("PowerPC" is a trademark of IBM Corporation) according to "The PowerPC Architecture: A Specification for a New Family of RISC Processors", second edition, 1994, Cathy May, et al. Ed., which is hereby incorporated herein by reference. A more specific implementation of a PowerPC microprocessor is described in the "PowerPC 604 RISC Microprocessor User's Manual", 1994, IBM Corporation, which is hereby incorporated herein by reference. The history buffer (not shown) of the present invention is included in CPU 210. The CPU 210 is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapters 234 and 240 are also coupled to the system bus 212. I/O adapter 218 may be a small computer system interface ("SCSI") adapter that communicates with a disk storage device 220. Communications adapter 234 interconnects bus 212 with an outside network enabling the data processing system to communicate with other such systems. Communications adapter 240 interconnects bus 212 with the switch 120, enabling the system 200 to direct the switch to reconfigure the data links $L_1$, $L_2$ etc. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system through the keyboard 224, trackball 232 or mouse 226 and receiving output from the system via speaker 228 and display 238. Additionally, an operating system such as AIX ("AIX" is a trademark of the IBM Corporation) is used to coordinate the functions of the various components shown in FIG. 2.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 3A:
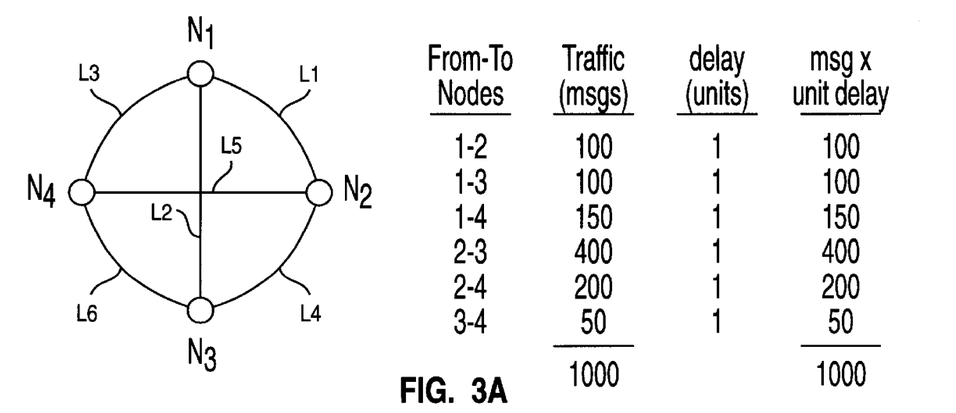
FIG. 3 illustrates three different configurations of a chordal network having four nodes.

Referring now to FIG. 3, a four node network is illustrated. In the chordal network of FIG. 3A, each node pair has one link directly interconnecting the pair. That is, for example, nodes $N_1$ and $N_2$ are directly connected by link $L_1$. And, for example, nodes $N_2$ and $N_4$ are directly interconnected by link $L_5$, and so on. Notice, of course, that node $N_1$ is also linked to $N_2$ in an indirect fashion through a number of paths. For example, $N_1$ is linked to node $N_2$ by a path through links $L_2$ and $L_4$. This is considered to be an indirect interconnection because there is an intervening node, node $N_3$, between nodes $N_1$ and $N_2$ for the path using links $L_2$ and $L_4$. Another way of saying that nodes $N_1$ and $N_2$ are directly linked by link $L_1$, is to consider that link $L_1$ has a first and second end, the first end terminating at node $N_1$, and the second end terminating at node $N_2$, so that nodes $N_1$ and $N_2$ are associated with link $L_1$. Thus, nodes $N_1$ and $N_2$ are the only nodes associated in this sense, with link $L_1$, and therefore the node pair $N_1$–$N_2$ can be said to have only a single link, although it is understood, as previously discussed, that nodes $N_1$ and $N_2$ are linked indirectly by a number of other links.

Referring now to the table, on the right hand side of FIG. 3A, information is shown regarding the traffic distribution at a particular moment for the network shown on the left in FIG. 3A. For example, at the moment illustrated, there are 100 messages from Node 1 directed to Node 2, or vice versa. Likewise, there are 100 messages between Node 1 and Node 3. Also, there are 150 messages directed between Node 1 and Node 4, and so on.

For a node which is directly connected by a single link to another node, the effective delay for that node pair is one unit. Since in FIG. 3A, each of the nodes is directly connected by one single link to each of the other nodes in the network, the delay for each node pair is one delay unit. The last column in the table in FIG. 3A, indicates the product of the number of messages at the moment illustrated and the delay for each of the node pairs.

Figure 3B:
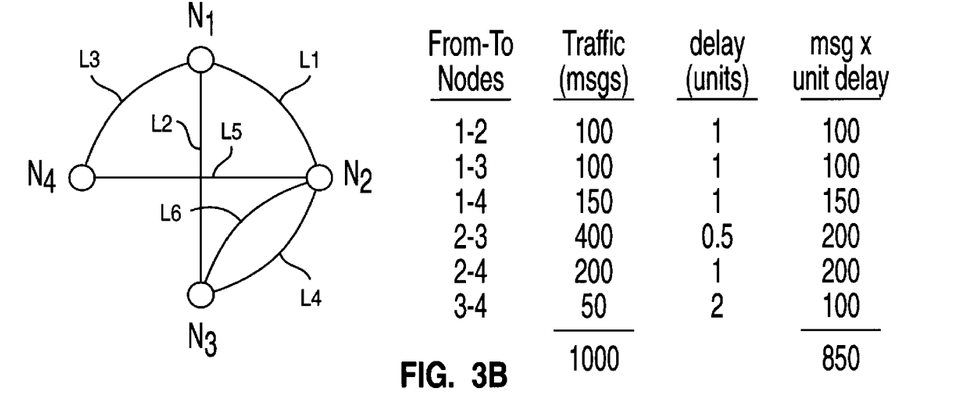

Referring now to FIG. 3B, a second configuration of the net is illustrated. In this configuration, link $L_6$ has been moved from node pair $N_3$–$N_4$ to node pair $N_2$–$N_3$. In the embodiment, the controller 110 of FIG. 1 has moved the link $L_6$ in accordance with an algorithm illustrated in FIGS. 4, 5, and 6.

Figure 4:
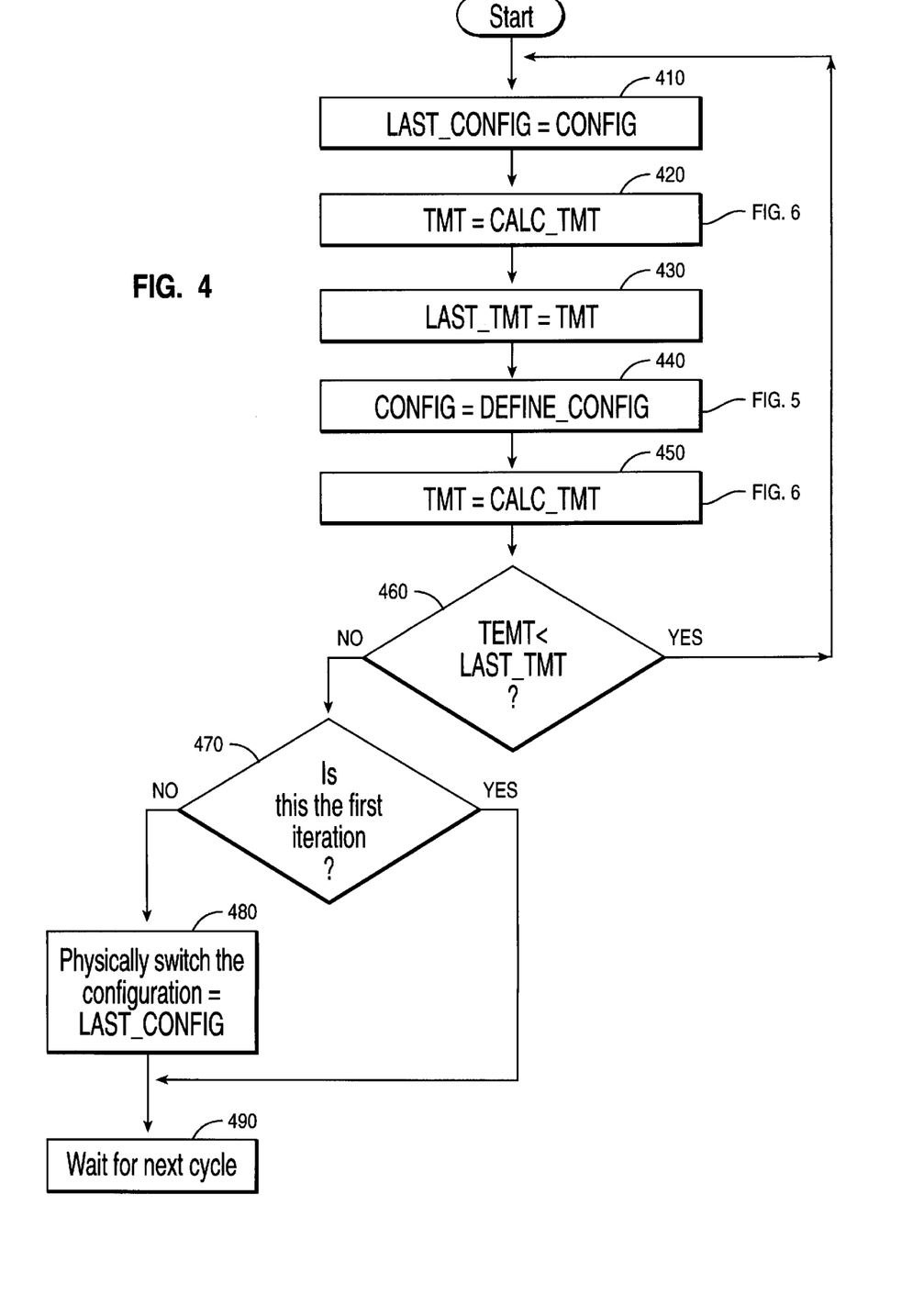
FIG. 4 illustrates a flow chart for controlling the dynamic adaptation of a network in accordance with an embodiment of the present invention.

Referring now to FIG. 4, the overall logic of the controller in the embodiment is illustrated. Initially at 410, the last configuration of the network is saved. That is, array variable "LAST_CONFIG" is set equal to an initial configuration, such as the configuration of FIG. 3A, as represented by array variable "CONFIG". Next at 420, a sub-routine "CALC_TMT" is called to calculate the total message time for the initial configuration, such as that of the network in FIG. 3A. Next at 430, the calculated total message time for the initial configuration of the network is saved as variable "LAST_TMT".

Next at 440, a sub-routine "DEFINE_CONFIG" is called to define a next configuration for the network, such as the configuration shown in FIG. 3B. Next at 450, the sub-routine "CALC_TMT" is again called, this time for calculating the total message time of the traffic distribution and network shown in FIG. 3B. Next at 460, the total message time for the second configuration is compared with that of the first configuration and, if the second configuration's message time is smaller, then the algorithm branches back to the beginning for a second iteration. In such a case, next at 410, the second configuration is saved as the last configuration, "LAST_CONFIG". Then at 430, the second configuration's total message time is saved as the last total message time, "LAST_TMT". Then at 440, the sub-routine is called to define a third configuration. And, at 450, the total message time for the third configuration is calculated, by calling the sub-routine. Next at 460, the total message time calculated for the third configuration, is compared with the total message time for the second configuration. If the third configuration has a smaller "TMT" than the second configuration, then the routine branches back again for yet another iteration, wherein a fourth configuration is analyzed. If however, the third's configuration "TMT" is not smaller than that of the second configuration, then the algorithm branches onward.

In such a case, at 470, if this is not the first iteration of the algorithm, and in this example it is not, then at 480, the network is physically switched to the configuration which was saved in array variable "LAST_CONFIG". That is, in the example, the network is physically switched to the configuration of the second configuration. Then at 490, the algorithm waits for the next cycle to be initiated. The cycle may be initiated by the lapsing of a predetermined time interval with is set by the user, or the cycle may be initiated by other events which the controller detects as programmed by the user.

Figure 5:
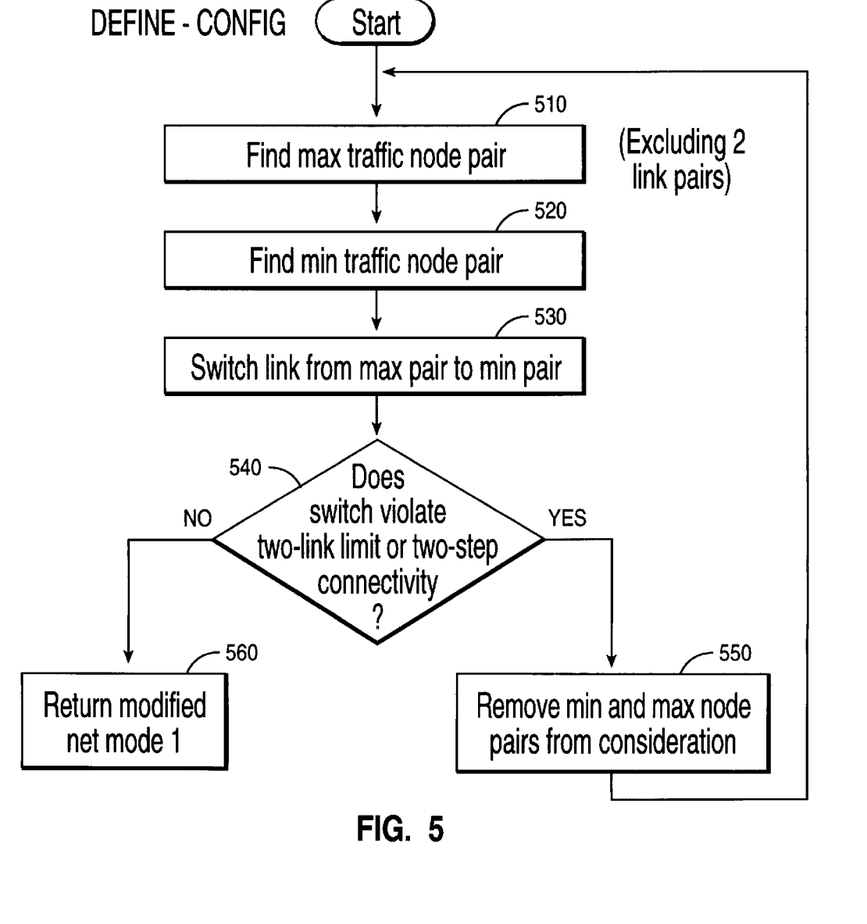
FIG. 5 illustrates a sub-routine for defining a new configuration of the network in accordance with an embodiment of the present invention.

Referring now to FIG. 5, the sub-routine "DEFINE_CONFIG" is illustrated. First, the network, as it is currently defined, is analyzed at 510 in order to find node pairs having the most messages. Node pairs having two links directly connecting the pair, are not considered in either Step 510 or 520. Likewise, node pairs having zero links therebetween are not considered. For example, referring to FIG. 3A, a node pair having the most messages is node pair $N_2$–$N_3$ having 400 messages. Next at 520, the node pair having the least number of messages is found. For example, in the network of FIG. 3A, node pair $N_3$–$N_4$ has the least number of messages with only 50 messages between nodes $N_3$–$N_4$.

In the event that more than one node pair has an equal number of messages and the node pairs which are thus tied also have the maximum or minimum traffic relative to other node pairs in the network, some selection criteria may be applied for selecting a node pair to be considered as the max traffic node pair or the min traffic node pair. Alternatively, one of the nodes may be selected at random from among those which are tied.

Having selected max and min traffic node pairs, next at 530, the algorithm models a new configuration wherein the link from the max traffic node pair is switched to the min traffic node pair. Next, the configuration is analyzed to determine if it violates a "two-link limit", or a "two-step connectivity". That is, according to the two-link limit, no two nodes can be directly connected by more than two links. And, according to two-step connectivity, a link directly connecting a node pair must remain in that configuration, if switching the link to a different node pair would result in the network having no series path between the pair of less than three links. The net effect of both the "limit" and "connectivity" rules is that the network must always have a path between each node pair of no more than two links in series, and no more than two links in parallel. If the switching at Step 530 results in a violation of these rules, then the algorithm branches back to the beginning but first, at 550, removes the min and max nodes pairs which were selected in the last iteration from being considered for future iterations. If the network configuration reflected by switching the link from the max traffic node pair to the min traffic node pair does not violate the two-link limit or two-step connectivity rules, then at 560, the model is returned to the main algorithm.

The two-link limit, of course, is merely one example of such a limit rule which the invention contemplates. The rule could be a three-link limit, or some other predetermined number of links. Likewise for the two-step connectivity rule, there could instead be a three-step connectivity rule, etc.

Figure 6:
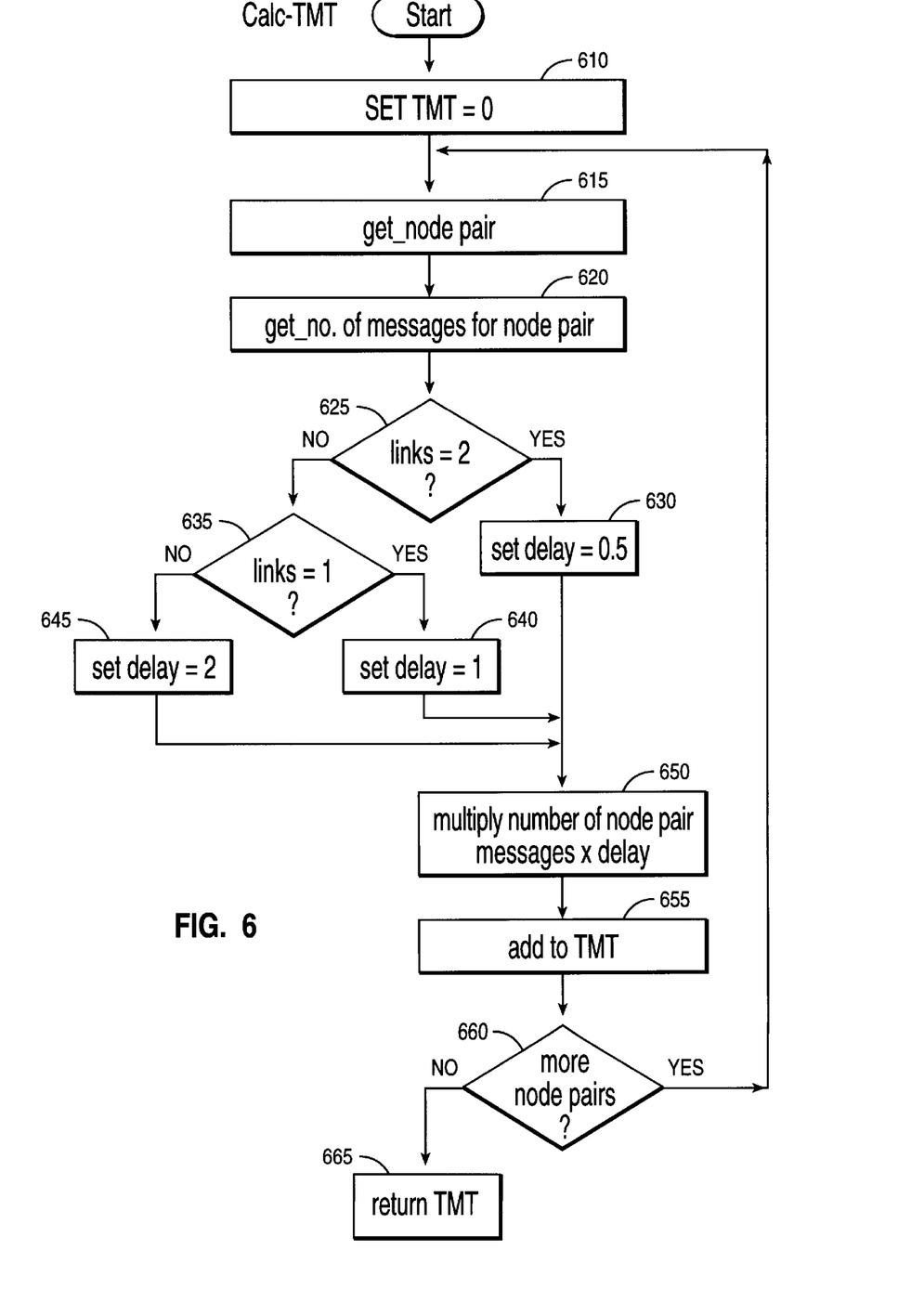
FIG. 6 illustrates a sub-routine for calculating total message time in accordance with an embodiment of the present invention.

Referring now to FIG. 6, the sub-routine is illustrated for calculating the total message time for a particular network configuration. Beginning at 610, the "TMT" is set equal to zero, then at 615, a first one of the node pairs in the network is identified. Next at 620, the number of messages for identified node pair is measured. Next at 625, the number of links between the identified node pair, that is the number of links directly connecting the identified node pair, is determined. If, at 640, the number of links is equal to two, then the delay time is set equal to one-half an delay unit at 630. If the number of links directly connecting the identified node is equal to one link, then at 640, the delay is set equal to one. If the number of links between the identified nodes is not equal to one, then, because of the two-step connectivity rule, the delay time is set to two, at 645. That is, because of the two-step connectivity rule, it is known that there is a path between any node pair in the network which has no more than two series links interconnecting the node pair. Therefore, the maximum delay between a node pair which does not have one link directly connecting the pair or two links directly connecting the pair is two delay units.

Next at 650, the number of node pair messages for the identified pair is multiplied times the delay which has been set, as determined based on the number of links between the identified node pair. This value is added to the accumulated value for the "TMT" at 655. Next at 660, it is determined whether there are additional node pairs which have not been identified yet for the network, and, if there are, then the routine loops back to get the next node pair at 615. This continues until each of the node pairs in the network have been analyzed and their delay times computed relative to the number of messages cued for the node pairs and have been added to the accumulated value of the total message time. Once all of the node pairs have been thus analyzed, the routine returns the accumulated value for the "TMT" at 665.

Note that an additional step can be included in the "TMT" routine, wherein the "TMT" is normalized. That is, the "TMT" may be divided by the total number of messages.

Returning to FIG. 3, the application of these algorithm and sub-routines will be illustrated using the traffic distribution and network configurations shown. In FIG. 3A, the total message time for the first network configuration is shown in the table, wherein for node pair $N_1$–$N_2$ the number of messages is multiplied times the delay unit to yield a product of 100 message delay units. Next for node pair $N_1$–$N_3$ the number of messages is multiplied times the delay unit and this is repeated for each of the nodes throughout. The products shown in the right hand column are then summed producing a total of 1000 message delay units. Referring to the second column from the left in the table of FIG. 3A, the node pairs having the maximum and minimum number of messages may be identified. Node pair $N_2$–$N_3$ with 400 messages, has the most messages. Node pair $N_3$–$N_4$, with 50 messages, has the least number of messages.

In the network shown in FIG. 3B, link $L_6$ has been moved from node pair $N_3$–$N_4$ to node pair $N_2$–$N_3$. Then in the table on the right hand side of FIG. 3B, the new total message time for the second network configuration is calculated. Note that since node pair $N_2$–$N_3$ now has two links directly interconnecting the nodes, the delay for this node pair is shown in the table as 0.5 units. And since the node pair in $N_3$–$N_4$ has no links directly interconnecting the node pair a message from node $N_3$ to $N_4$ would have to traverse a path having at least two links. Therefore, the delay for node pair $N_3$–$N_4$ is two delay units. Next the number of messages for each node pair is multiplied by the delay units for the node pair and these products are summed to yield a total message time for the second network configuration equal to 850 message delay units.

Since this number represents an improvement over the total message time of the first configuration, therefore a third configuration is considered, wherein one of the links is moved from the node pair having a maximum number of messages in the second configuration to one of the node pairs in the second configuration having a minimum number of messages. Since node pair $N_2$–$N_3$ has already had a link added to it, it is no longer a candidate for max traffic node pair. And likewise since, node pair $N_3$–$N_4$ had it's link removed, it is no longer a candidate for minimum traffic node pair. Thus reviewing the remaining candidates in the column second from the left in FIG. 3B, node pair $N_2$–$N_4$ is identified as the next maximum traffic node pair and node pairs $N_1$ and $N_2$, and $N_1$ and $N_3$ are identified as being tied for the minimum traffic node pairs.

Figure 3C:
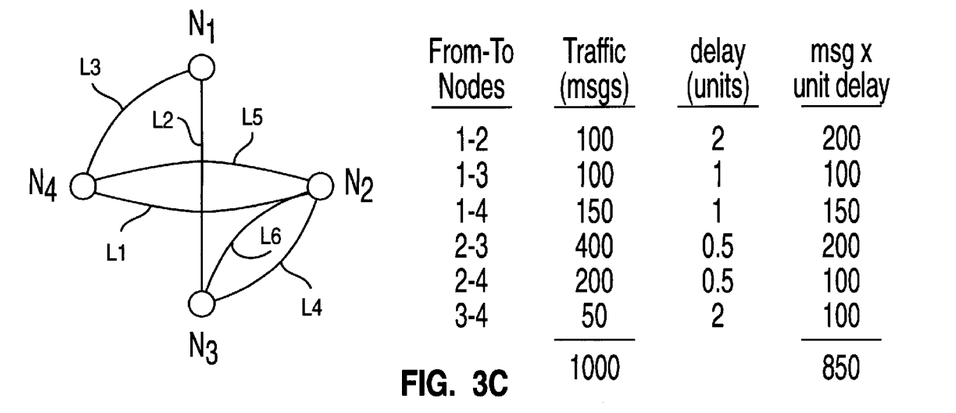

Referring now to the network of FIG. 3C, a third configuration is shown. In this third configuration the link $L_1$ has been moved from one of the minimum traffic node pairs, that is node pair $N_1$–$N_2$ to the next maximum traffic node pair, node pair $N_2$–$N_4$. Thus the delay for node pair $N_1$–$N_2$ is now two delay units and the delay for node pair $N_2$–$N_4$ is now 0.5 delay units. As shown in the right hand column of FIG. 3C, the new total message time is computed for the network of the third configuration. This total message time is compared with that of the second configuration and it is determined that the third configuration is not an improvement. Therefore, the network is switched to the configuration of FIG. 3B, the last configuration yielding an improved "TMT".

Following is pseudo-code for the algorithms set forth in FIGS. 4–6. Note, however, that some of the subroutine and variable names differ from those in the FIG's. Included at the end of the pseudo-code is a representation of the data structure for the network configuration and traffic shown in FIG. 3A.

```
Adaptnet(Traffic, Network) {
  New-Network = Modify-Net(Traffic, Network)
  New-Delay = Calc-Delay(Traffic, New-Network)
  Delay = Calc-Delay(Traffic,Network)
  While (New-Delay < Delay) {
    Network = New-Network
    Delay = New-Delay
    New-Network = Modify-Net(Traffic, Network)
    New-Delay = Calc-Delay(Traffic, New-Network)
  }
  Return(Network)
}
Modify-Net (Traffic, Network) {
  Old-Network = Network
  Traffic-Min = 1
  Traffic-Max = 0
  Record-Max = 0
  Record-Min = 0
  Record = 0
  /*Find High and Low Traffic Areas*/
  While (Network != NULL) {
  Record++
  Traffic-Temp = Second(First(Traffic))
  if (Traffic-Temp >= Traffic-Max) {
    Traffic-Max = Traffic-Temp
    Record-Max = Record }
  if (Traffic-Temp < Traffic-Min) {
    Traffic-Min = Traffic-Temp
    Record-Min = Record }
  }
  /*Modify the Links in High and Low Traffic Areas*/
  Replace-Net(2,Second(Record-Find(Record-Max,Network)))
  Replace-Net(0,Second(Record-Find(Record-Min,Network)))
  /*Check for Two-Step Reachability*/
  if(Reach(First(Record-Find(Record-Min,Network))) < 3)
  Return(Network)
  Else
  Return(Old-Network)
}
Calc-Delay (Traffic, Network) {
  Total = 0
  Count = 0
  While(Network != NULL) {
    Total=Total+Second(First(Network))*Second(First(Traffic))
    Network = Rest(Network)
    Traffic = Rest(Traffic)
  }
  Delay = Total
  Return(Delay)
}
Network = ((1-2 1)(1-3 1)(1-4 1)(2-3 1)(2-4 1)(3-4 1))
Traffic = ((1-2 .1)(1-3 .1)(1-4 .15)(2-3 .4)(2-4 .2)(3-4 .05))
```

While the invention has been shown and described with reference to particular embodiments thereof, it will be understood by those skilled in the art that the foregoing and other changes in form and detail may be made therein without departing from the spirit and scope of the invention.

What is claimed is:

1. A method of controlling a configuration of a network of nodes interconnected by links, wherein messages have respective source and destination ones of the nodes, so that the respective source and destination nodes for each one of the messages define a node pair with which the message is associated, and wherein each node pair in the network has a determinable number of associated messages, comprising the steps of:

a) calculating a total message time for a first configuration of the links;

b) selecting a pair of the nodes having a minimum number of messages, and another pair of the nodes having a maximum number of messages, and defining a second configuration, wherein a link from the first configuration is moved from one of the selected pairs to the other one of the selected pairs;

c) calculating a total message time for the second configuration of the links; and d) switching the network to the second configuration in response to the total message time for the second configuration being smaller than for the first configuration;

wherein the links have first and second ends, so that a link's ends define a node pair with which the link is associated, and, for a given network configuration, each node pair in the network has a determinable number of associated links; and wherein steps a) and c) comprise the steps of:

computing products of certain factors for each respective pair of nodes, the factors including: i) a certain delay time per link, ii) a number of links, and iii) a number of messages; and summing the products to yield a total message time.

2. The method of claim 1, wherein in step b) the selecting is limited to selecting which maintains a network path having a predetermined maximum number of series-connected links between each node pair in the network.

3. The method of claim 1, wherein the links have first and second ends, so that a link's ends define a node pair with which the link is associated, and each node pair in the network has a determinable number of associated links; and wherein in step b) the selecting is limited to selecting which maintains a predetermined maximum number of links associated with each node pair in the network.

4. The method of claim 1, wherein the first configuration of the links is a chordal network configuration.

5. The method of claim 1, wherein, for n nodes, the network has at least $_nC_2$ links, so that the number of links is sufficient for each of the nodes to be directly linked to each of the other nodes.

6. The method of claim 1, wherein in step b) the selecting is limited to selecting which maintains a network path having a predetermined maximum number of series-connected links between each node pair in the net.

7. The method of claim 6, wherein in step b) the selecting is limited to selecting which maintains a predetermined maximum number of links associated with each node pair in the network.

8. The method of claim 7, wherein the first configuration of the links is a chordal network configuration.

9. The method of claim 8, wherein, for n nodes, the network has at least $_nC_2$ links, so that the number of links is sufficient for each of the nodes to be directly linked to each of the other nodes.

10. A method of controlling message traffic on a network of nodes interconnected by links, wherein messages have source and destination nodes, so that the respective source and destination nodes for each one of the messages define a node pair with which the message is associated, and each node pair in the network has a defined number of associated messages, comprising the steps of:

a) calculating a total message time for a first configuration of the links;

b) selecting a pair of the nodes having a minimum number of messages, and another pair of the nodes having a maximum number of messages, and defining a second configuration of the links, wherein a link from the first configuration is moved from one of the selected pairs to the other one of the selected pairs;

c) calculating a second total message time for the second configuration of the links;

d) selecting, in response to the second total message time being less than the first total message time, a pair of the nodes having a minimum number of measured messages in the second configuration, and a pair of the nodes having a maximum number of measured messages in the second configuration, and defining a third configuration of the links, wherein a link from the second configuration is moved from one of the pairs selected in this step d) to the other one of the pairs selected in this step d);

e) calculating a third total message time for the third configuration of the links; and f) switching the links to the third configuration, in response to the total message time being smaller for the third configuration than for the first and second configurations.

11. The method of claim 10, wherein in each of steps b) and d) the selecting is limited to selecting which maintains a network path having a predetermined maximum number of series-connected links between each node pair in the network.

12. The method of claim 10, wherein the links have first and second ends, so that a link's ends define a node pair with which the link is associated, and each node pair in the network has a determinable number of associated links, and wherein in each of steps b) and d) the selecting is limited to selecting which maintains a predetermined maximum number of links associated with each node pair in the network.

13. The method of claim 10, wherein the links have first and second ends, so that a link's ends define a node pair with which the link is associated, and each node pair in the network has a determinable number of associated links; and wherein each of steps a) and c) comprise the steps of:

computing a product of certain factors for each respective pair of nodes, the factors including: i) a certain delay time per link, ii) a number of links and iii) a number of messages; and summing the products to yield a total message time.

14. The method of claim 13, wherein in each of said steps b) and d), the selecting is limited to selecting which maintains a network path having a predetermined maximum number of series-connected links between each node pair in the network.

15. The method of claim 14, wherein the links have first and second ends, so that a link's ends define a node pair with which the link is associated and each node pair in the network has a determinable number of associated links, and wherein in each of steps b) and d) the selecting is limited to selecting which maintains a predetermined maximum number of links associated with each node pair in the network.

16. The method of claim 15, wherein the first configuration of the links is a chordal network configuration.

17. The method of claim 15, wherein, for n nodes, the network has at least $_nC_2$ links, so that the number of links is sufficient for each of the nodes to have its own link to each of the other nodes.

18. The method of claim 10, wherein the first configuration of the links is a chordal network configuration.

19. The method of claim 10, wherein, for n nodes, the network has at least $_nC_2$ links, so that the number of links is sufficient for each of the nodes to be directly linked to each of the other nodes.

20. A computer network comprising:

nodes for sending and receiving messages;

links for carrying the messages among the nodes, wherein each such link connects a pair of the nodes, and wherein a certain configuration of connections of the links and nodes defines a first configuration of the network;

means for automatically configuring link terminations among the nodes in response to a measured rate of the messages on the links, comprising:

means for calculating a total message time for configurations of the links;

means for selecting a pair of the nodes having a minimum number of messages, and another pair of the nodes having a maximum number of messages, and defining a second configuration, wherein a link from the first configuration is moved from one of the selected pairs to the other one of the selected pairs; and means for switching the network, by a network controller, to the second configuration in response to the total message time for the second configuration being smaller than for the first configuration.

21. The computer network of claim 20, wherein the links have first and second ends, so that a link's ends define a node pair with which the link is associated, and each node pair in the network has a determinable number of associated links; and wherein the means for calculating comprises:

means for computing products of certain factors for each respective pair of nodes, the factors including: i) a certain delay time per link ii) a number of links and iii) a number of messages; and means for summing the products to yield a total message time.

22. The computer network of claim 21, wherein the means for selecting maintains a network path having a predetermined maximum number of series-connected links between each node pair in the network.

23. The computer network of claim 22, wherein the means for selecting maintains a predetermined maximum number of links associated with each node pair in the network.

24. The computer network of claim 23, wherein the first configuration of the links is a chordal network configuration.

25. The computer network of claim 23, wherein, for n nodes, the network has at least $_nC_2$ links, so that the number of links is sufficient for each of the nodes to be directly linked to each of the other nodes.

26. The computer network of claim 20, wherein the means for selecting maintains a network path having a predetermined maximum number of series-connected links between each node pair in the network.

27. The computer network of claim 20, wherein the links have first and second ends, so that a link's ends define a node pair with which the link is associated, and each node pair in the network has a determinable number of associated links; and wherein the means for selecting maintains a predetermined maximum number of links associated with each node pair in the network.

28. The computer network of claim 20, wherein the first configuration of the links is a chordal network configuration.

29. The computer network of claim 20, wherein, for n nodes, the network has at least $_nC_2$ links, so that the number of links is sufficient for each of the nodes to be directly linked to each of the other nodes.

30. A computer program product readable by a machine, tangibly embodying a program of instructions executable by the machine to perform method steps for controlling message traffic on a network of nodes interconnected by links, wherein messages have source and destination nodes, so that the respective source and destination nodes for each one of the messages define a node pair with which the message is associated, and each node pair in the network has a determinable number of associated messages; the method comprising the steps of:

a) calculating a total message time for a first configuration of the links;

b) selecting a pair of the nodes having a minimum number of messages, and another pair of the nodes having a maximum number of messages, and defining a second configuration, wherein a link from the first configuration is moved from one of the selected pairs to the other one of the selected pairs;

c) calculating a total message time for the second configuration of the links; and d) switching the network, by a network controller, to the second configuration in response to the total message time for the second configuration being smaller than for the first configuration.

31. The computer program product of claim 30, wherein the links have first and second ends, so that a link's ends define a node pair with which the link is associated, and each node pair in the network has a determinable number of associated links; and wherein each of steps a) and c) comprise the steps of:

computing products of certain factors for each respective pair of nodes, the factors including: i) a certain delay time per link, ii) a number of links and iii) a number of messages; and summing the products to yield a total message time.

32. The computer program product of claim 31, wherein in step b) the selecting is limited to selecting which maintains a predetermined maximum number of links associated with each node pair in the network.

33. The computer program product of claim 32, wherein the first configuration of the links is a chordal network configuration.

34. The computer program product of claim 32, wherein, for n nodes, the network has at least $_nC_2$ links, so that the number of links is sufficient for each of the nodes to be directly linked to each of the other nodes.

35. The computer program product of claim 30, wherein in step b) the selecting is limited to selecting which maintains a network path having a predetermined maximum number of series-connected links between each node pair in the network.

36. The computer program product of claim 30, wherein the links have first and second ends, so that a link's ends define a node pair with which the link is associated, and each node pair in the network has a determinable number of associated links; and wherein in step b) the selecting is limited to selecting which maintains a predetermined maximum number of links associated with each node pair in the network.

37. The computer program product of claim 30, wherein the first configuration of the links is a chordal network configuration.

38. The computer program product of claim 30, wherein, for n nodes, the network has at least $_nC_2$ links, so that the number of links is sufficient for each of the nodes to be directly linked to each of the other nodes.

39. The computer program product of claim 30, wherein in step b) the selecting is limited to selecting which maintains a network path having a predetermined maximum number of series-connected links between each node pair in the network.

* * * * *